US010628865B2

(12) United States Patent
Bermudez et al.

(10) Patent No.: US 10,628,865 B2
(45) Date of Patent: Apr. 21, 2020

(54) SUBSCRIPTION MANAGEMENT PLATFORMS FOR AUTOMATED GROUP-BASED SUBSCRIPTIONS

(71) Applicant: Capital One Services, LLC, McLean, VA (US)

(72) Inventors: Sophie Bermudez, Washington, DC (US); Akbar Hosseinkhani, Burke, VA (US); Omar Khan, Marriottsville, MD (US); Khosro Akhavan Astaneh, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/121,032

(22) Filed: Sep. 4, 2018

(65) Prior Publication Data

US 2020/0074520 A1    Mar. 5, 2020

(51) Int. Cl.
| | |
|---|---|
| *G06Q 30/06* | (2012.01) |
| *H04L 29/08* | (2006.01) |
| *G06Q 30/02* | (2012.01) |
| *G06Q 20/26* | (2012.01) |
| *G06Q 20/14* | (2012.01) |

(52) U.S. Cl.
CPC ......... *G06Q 30/0619* (2013.01); *G06Q 20/14* (2013.01); *G06Q 20/26* (2013.01); *G06Q 30/0226* (2013.01); *H04L 67/20* (2013.01)

(58) Field of Classification Search
CPC .......... G06Q 30/0619; G06Q 30/0226; G06Q 20/26; G06Q 20/14; H04L 67/20
See application file for complete search history.

(56) References Cited

U.S. PATENT DOCUMENTS

| | | | | |
|---|---|---|---|---|
| 8,458,051 | B1* | 6/2013 | Saltzman | G06Q 10/06 705/26.7 |
| 2002/0154751 | A1* | 10/2002 | Thompson, III | G06Q 10/10 379/114.01 |
| 2005/0086126 | A1 | 4/2005 | Patterson | |
| 2007/0281663 | A1 | 12/2007 | Sandholm et al. | |
| 2008/0033857 | A1 | 2/2008 | Moses | |
| 2009/0006195 | A1* | 1/2009 | Rosen | G06Q 30/02 705/14.1 |

(Continued)

*Primary Examiner* — Raquel Alvarez
(74) *Attorney, Agent, or Firm* — Harrity & Harrity, LLP

(57) ABSTRACT

A computing resource of a cloud computing environment receives, from customers in a customer population, requests to enroll in group-based subscriptions provided by third-party providers. The requests include customer preferences associated with the customers. The computing resource determines customer account attributes for customer accounts, and determines, using a customer matching model, scores for the customers based on the customer preferences and the customer account attributes. The scores predict a successful matching among the customers in the customer population. The computing resource assigns a first subset of the customers in the customer population to a first group of customers based on the scores, enrolls the first group of customers in a first account for a first group-based subscription provided by a first third-party provider, and allocates a payment for the first group-based subscription among a first group of customer accounts associated with customers in the first group of customers.

20 Claims, 9 Drawing Sheets

(56) References Cited

U.S. PATENT DOCUMENTS

| | | | |
|---|---|---|---|
| 2013/0211944 A1* | 8/2013 | Momin | G06Q 30/02 |
| | | | 705/26.2 |
| 2014/0006158 A1 | 1/2014 | Cooper | |
| 2015/0066686 A1* | 3/2015 | Hoch | G06N 3/006 |
| | | | 705/26.7 |
| 2017/0004282 A1* | 1/2017 | Scantland | G06F 19/3456 |

* cited by examiner

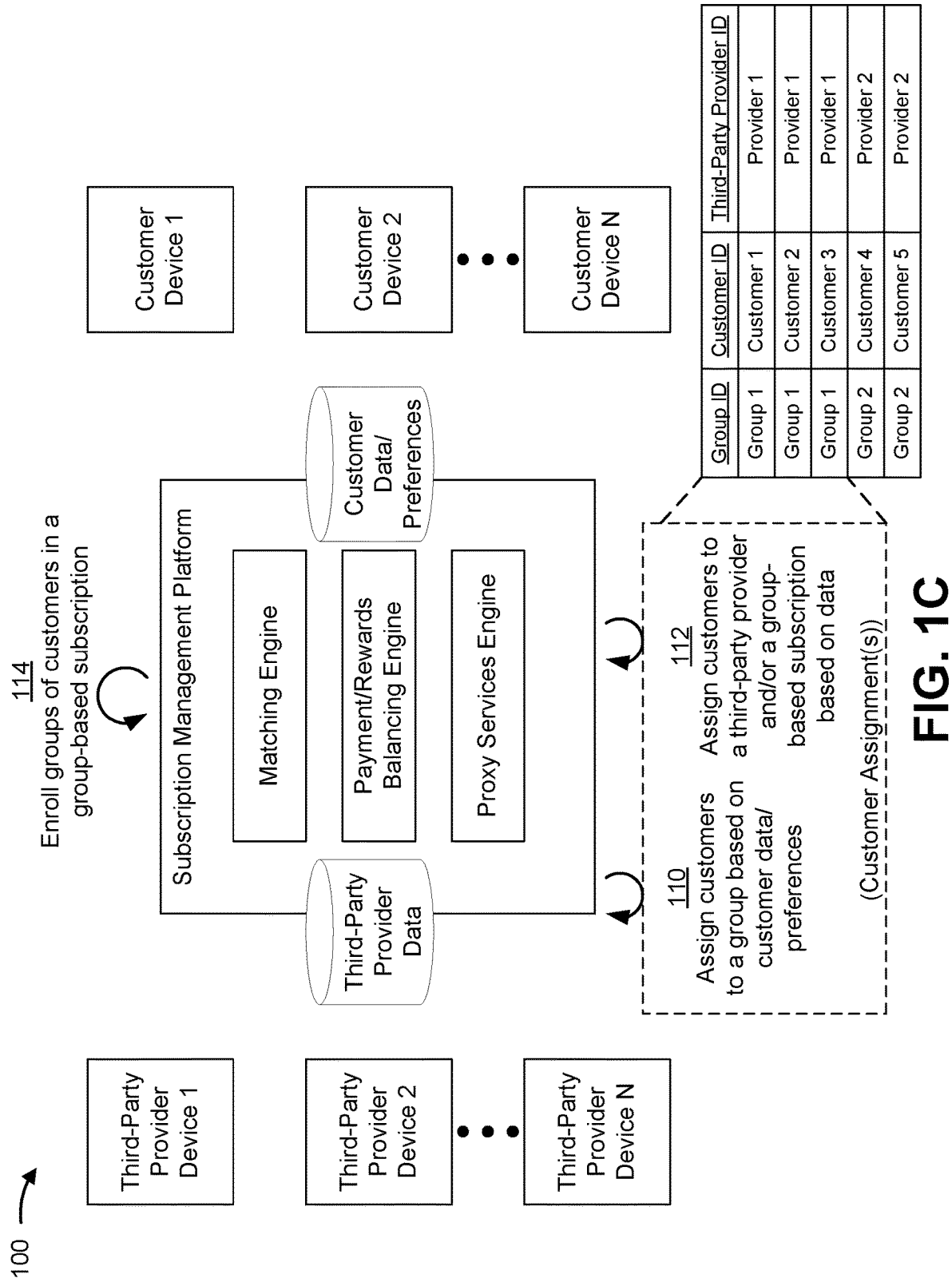

SUBSCRIPTION MANAGEMENT PLATFORMS FOR AUTOMATED GROUP-BASED SUBSCRIPTIONS

BACKGROUND

Group-based subscriptions enable a group of people, typically friends and/or family members, to sign up and share a subscription, which typically includes a reduced or discounted rate. Example group-based subscriptions include, without limitation, subscriptions for access to online news publications, movie and/or television streaming services, music streaming services, mobile phone services, family meal kits, and/or the like. Group-based subscriptions are becoming more and more popular in the marketplace, by virtue of the benefits provided to both merchants and consumers alike. Offering group-based subscriptions allows a merchant to benefit from recurring sales while more efficiently managing inventory and predicting revenue. Similarly, consumers may benefit from the discounted rates associated with group-based purchasing while experiencing the convenient "autopilot" simplicity of a subscription.

SUMMARY

According to some implementations, a method may include receiving, by a computing resource of a cloud computing environment, requests to subscriptions provided by third-party providers, wherein the requests are received from customers in a customer population, and wherein the requests include customer preferences associated with the customers. The method may include determining, by a computing resource of the cloud computing environment, customer account attributes for customer accounts associated with the customers. The method may include determining, by a computing resource of the cloud computing environment and using a customer matching model, scores for the customers based on the customer preferences and the customer account attributes, wherein the scores predict a successful matching among the customers in the customer population. The method may include assigning, by a computing resource of the cloud computing environment, a first subset of the customers in the customer population to a first group of customers based on the scores. The method may include enrolling, by a computing resource of the cloud computing environment, the first group of customers in a first account for a first group-based subscription provided by a first third-party provider. The method may include allocating, by a computing resource of the cloud computing environment, a payment for the first group-based subscription among a first group of customer accounts associated with customers in the first group of customers.

According to some implementations, a device may include one or more memories, and one or more processors, communicatively coupled to the one or more memories, to receive, from one or more third-party providers, conditions for enrolling in one or more group-based subscriptions offered by the one or more third-party providers. The one or more processors may receive, from customers in a customer population, requests to enroll in the one or more group-based subscriptions offered by the one or more third-party providers, wherein the requests include customer preferences. The one or more processors may determine, using a customer matching model, scores for the customers based on the conditions for enrolling in the one or more group-based subscriptions and the customer preferences, wherein the scores predict a successful matching of the customers to a group-based subscription. The one or more processors may assign a first subset of the customers in the customer population to a group of customers based on the scores, assign the group of customers to a first group-based subscription based on the scores, and enroll the group of customers in a first account associated with the first group-based subscription. The one or more processors may receive a request for payment of an invoice associated with the first group-based subscription, and may determine, based on a total amount of the invoice, proportionate billing amounts for customers in the group of customers. The one or more processors may determine a lead account from among a group of customer accounts associated with the customers in the group of customers, wherein the lead account is determined based on customer account attributes associated with the lead account, and may determine non-lead accounts from among the group of customer accounts associated with the customers in the group of customers. The one or more processors may pay the total amount of the invoice for the first group-based subscription using an account number associated with the lead account, may debit the proportionate billing amounts from the non-lead accounts in the group of customer accounts, and may credit the proportionate billing amounts debited from the non-lead accounts to the lead account.

According to some implementations, a non-transitory computer-readable medium may store instructions that include one or more instructions that, when executed by one or more processors of a device, cause the one or more processors to receive requests to enroll in one or more group-based subscriptions provided by third-party providers, wherein the requests are received from customers in a customer population, and wherein the requests include customer preferences associated with the customers. The one or more instructions may cause the one or more processors to determine customer account attributes for customer accounts associated with the customers, and to determine, using a customer matching model, scores for the customers based on the customer preferences and the customer account attributes, wherein the scores predict a successful matching among the customers in the customer population. The one or more instructions may cause the one or more processors to assign a first subset of the customers in the customer population to a first group of customers based on the scores, and to assign a second subset of the customers in the customer population to a second group of customers based on the scores. The one or more instructions may cause the one or more processors to enroll the first group of customers in a first account for a first group-based subscription, and to enroll the second group of customers in a second account for a second group-based subscription. The one or more instructions may cause the one or more processors to allocate a payment for the first group-based subscription among a first group of customer accounts associated with customers in the first group of customers, and to allocate a payment for the second group-based subscription among a second group of customer accounts associated with customers in the second group of customers.

BRIEF DESCRIPTION OF THE DRAWINGS

FIGS. 1A-1D are diagrams of an example implementation described herein.

DETAILED DESCRIPTION

Figure 1A:
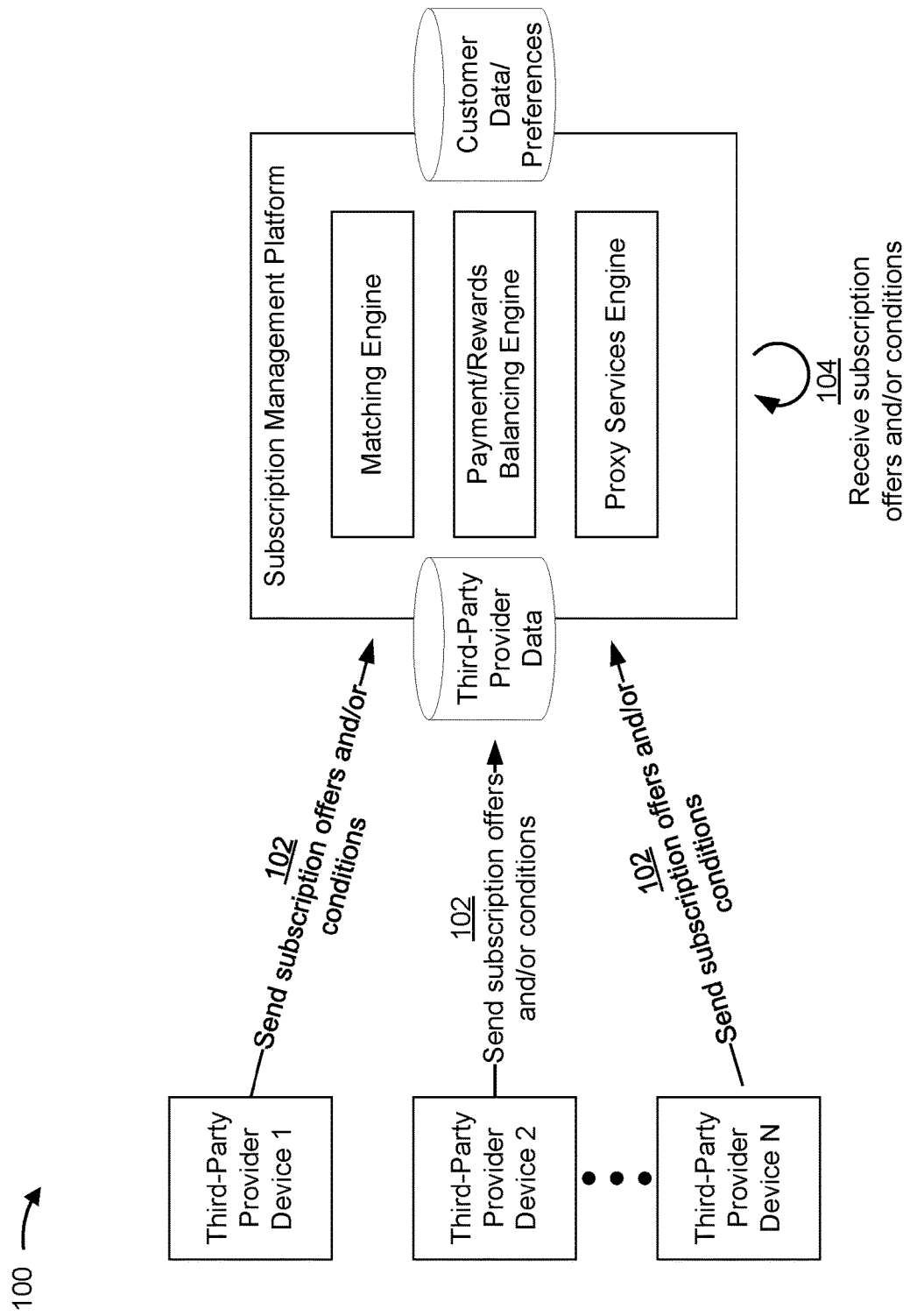

The following detailed description of example implementations refers to the accompanying drawings. The same reference numbers in different drawings may identify the same or similar elements.

Recent studies of consumer purchasing behaviors reveal the consumers' desire for simple, convenient, and hassle-free shopping. More and more consumers are purchasing subscriptions for convenient, automatic renewals of orders for goods and services, including, without limitation, orders for toiletries, meal kits, access to online news, mobile phone services, internet services, streaming services for music, television, and/or movies, and/or the like.

Oftentimes, providers will offer discounted rates for purchases made by a group, using a so-called "family plan" or group-based subscription. However, many consumers lack the connections necessary to join a group-based subscription. Other consumers are wary of joining a group-based subscription, as these consumers may be required to pay for the group-based subscription on behalf of an entire group without any assurance of ever being reimbursed for making the payment. Similarly, other consumers are fearful of assuming liability for an unpaid debt of another group member as a result of a deficient payment for the group-based subscription.

Some implementations described herein provide a flexible, scalable, and intelligent subscription management platform, which is configured to analyze a large volume of data and intelligently group a provider's existing customers for enrollment in and/or the purchase of a group-based subscription based on the data. The subscription management platform may additionally automate aspects relating to the enrollment of customers in the group-based subscription and/or the payment of the group-based subscription by the customers. In this way, the subscription management platform may improve the efficiency at which group-based subscriptions are implemented, while conserving computing resources (e.g., processors, memories, etc.) that would otherwise be consumed by efforts to offer, enroll, and/or arrange payments for the group-based subscriptions.

In this way, the enrollment and payment of group-based subscriptions may be standardized for many different types of group-based subscriptions, despite variances in terms of the group-based subscriptions and/or constraints imposed by the third-party providers (i.e., merchants) offering the group-based subscriptions. The subscription management platform described herein may receive and analyze thousands, millions, billions, or more instances of data (e.g., group-based subscription offer and/or condition data, customer data, customer account data, and/or the like), for managing and/or automating aspects relating to the provision and/or implementation of group-based subscriptions, the volume of which cannot be processed objectively by human actors.

FIGS. 1A-1D are diagrams of an example implementation 100 described herein. As shown in FIGS. 1A-1D, example implementation 100 may include one or more third-party provider devices, one or more customer devices, and a subscription management platform, as described herein. The subscription management platform may include one or more computing modules or engines (e.g., a matching engine, a payment and/or rewards balancing engine, a proxy services engine, etc.), as described herein.

As shown in FIG. 1A, and by reference number 102, a plurality of third-party providers may, using a plurality of third-party provider devices, send subscription offers and/or conditions to the subscription management platform. Each third-party provider may send offers and/or conditions for one subscription, or multiple subscriptions, in some implementations. For example, a first third-party provider may access a first third-party provider device to send one or more subscription offers and/or conditions for one or more subscriptions, a second third-party provider may access a second third-party provider device to send one or more subscription offers and/or conditions for one or more subscriptions, and an Nth third-party provider (i.e., where N>2) may access an Nth third-party provider device to send one or more subscription offers and conditions for one or more subscriptions. Example third-party provider devices may include, without limitation, third-party computing devices (e.g., computers, kiosks, laptop computers, desktop computers, tablets, etc.), mobile devices, servers, and/or the like. In some implementations, the subscriptions include offers and/or conditions associated with group-based subscriptions available for purchase by a group of subscribers (i.e., customers).

The third-party providers may, using the third-party provider devices, send the subscription offers and/or conditions to the subscription management platform using any electronic messaging protocol and/or data format. As an example, the third-party provider devices may access a packet data network to send the subscription offers and/or conditions to the subscription management platform using a packet data protocol (PDP). As another example, the third-party provider devices may export electronic data files containing the subscription offers and/or conditions to the subscription management platform, stream electronic data files containing the subscription offers and/or conditions to the subscription management platform, send the electronic data files to the subscription management platform using wired or wireless connections, and/or the like. In some implementations, the third-party provider devices may send the subscription offers and/or conditions using a same messaging protocol, format, and/or method. In some implementations, the third-party provider devices may send the subscription offers and/or conditions using different messaging protocols, formats, and/or methods. As indicated by reference number 104, the subscription management platform may receive the offers and conditions from the one or more third-party provider devices.

In some implementations, the subscription offers received by the subscription management platform may include offer data, details, and/or attributes associated with the one or more subscriptions. For example, the subscription offers received by the subscription management platform may include data indicating the product or service included in the subscriptions (e.g., a mobile phone service, a movie streaming service, a music streaming service, a grocery or meal kit subscription, etc.), data indicating timing attributes associated with the subscriptions (e.g., the subscription start date, the subscription end date, the subscription billing date, the minimum and/or maximum lengths of the subscription, etc.), data indicating pricing attributes associated with the subscriptions (e.g., the total price, the price per person, the price per unit, etc.), data indicating a minimum and/or maximum number of subscribers associated with the subscriptions, and/or the like.

In some implementations, the subscription conditions received by the subscription management platform may include conditional data (e.g., terms, restrictions, constraints, etc.), details, or attributes associated with obtaining, accessing, and/or using the one or more subscriptions. The conditions may further include conditional data, details, or attributes associated with subscriber eligibility and/or subscriber agreements to the terms and/or conditions of the one or more subscriptions. For example, the subscription conditions received by the subscription management platform may include data indicating geographical restrictions or constraints for subscribers that may use or access the subscriptions, data indicating one or more subscriber agreements, data indicating usage restrictions (e.g., a number of minutes, hours, days, etc., that the good and/or service may be accessed or used, a number of concurrent accesses or uses of the good and/or service that is permitted, and/or the like), data indicating restrictions on the number of network addresses associated with the subscriptions (e.g., access to a service may be limited to two, three, four, etc., IP addresses, etc.), data indicating termination attributes associated with the subscriptions (e.g., conditions for termination, non-payment, etc.), data indicating legal attributes associated with the subscriptions (e.g., limits on using intellectual property, data indicating a chosen legal forum for settling disputes, etc.), data indicating limitations associated with the subscriptions, data associated with a maximum number of subscribers and/or groups that may be associated with the subscriptions, and/or the like.

In some implementations, the subscription offers and/or conditions are stored by the subscription management platform as third-party provider data. Where stored, the offers and/or conditions may be updated periodically or in real-time, as desired. The subscription offers and/or conditions may be stored as data in one or more data structures included in one or more memories and/or secure elements of the subscription management platform. The subscription offers and/or conditions received by the subscription management platform may include offers and/or conditions for a single subscription from each third-party provider or multiple subscriptions from each third-party provider.

In some implementations, the third-party providers include, for example, merchants, corporations, business entities, and/or the like. Example third-party providers may include, without limitation, internet service providers, streaming (e.g., movie, music, television, sports, entertainment, etc.) service providers, mobile phone service providers, news publication providers, fitness-center service providers, food merchants, clothing merchants, merchants of a good and/or service, and/or the like.

Figure 1B:
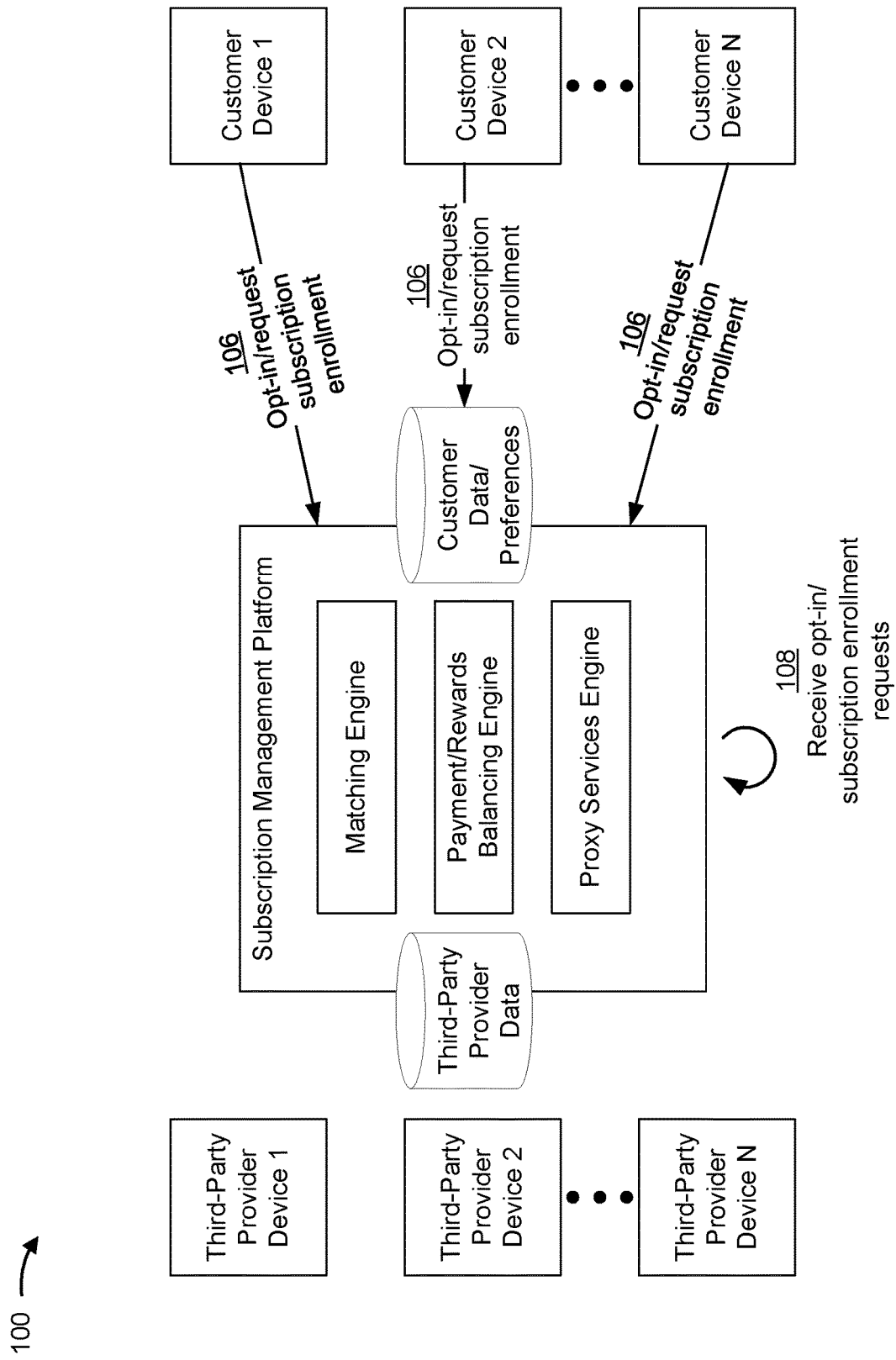

As shown in FIG. 1B, and by reference number 106, a plurality of customers may, using a plurality of customer devices, send messages to the subscription management platform for opting-in and/or requesting enrollment in one or more subscriptions provided by the third-party providers. In some implementations, the customers may be existing customers included in a customer population associated with a provider of the subscription management platform. For example, the customers may have accounts (e.g., financial accounts, credit card accounts, checking accounts, etc.) established with the provider of the subscription management platform. In this way, the subscription management platform may have access to and/or obtain personal and/or financial information associated with the customers, by which the subscription management platform may implement automated enrollment and/or payment for subscriptions on behalf of the customers upon receiving the opt-in and/or enrollment requests.

In some implementations, as shown in FIG. 1B, a first customer may access a first customer device for sending one or more requests to opt-in and/or enroll in one or more subscriptions, a second customer may access a second customer device for sending one or more requests to opt-in and/or enroll in one or more subscriptions, and a Nth customer may access a Nth customer device for sending one or more requests to opt-in and/or enroll in one or more subscriptions. Example customer devices may include, without limitation, computing devices (e.g., computers, laptop computers, desktop computers, tablets, etc.), wearable computing devices (e.g., computing eyeglasses, watches, etc.), mobile devices, and/or the like. In some implementations, the messages sent by the customer devices to the subscription management platform may include and/or indicate customer preferences. In some implementations, the customers may access a user interface of the customer device for generating and sending the requests to opt-in and/or enroll in the one or more subscriptions, and/or to indicate customer preferences, as described herein.

For example, in some implementations, the customer may request to participate in a subscription offered by a specific third-party provider (e.g., the customer requests participation in a group-based movie streaming subscription offered by Netflix®). In this case, for example, the subscription management platform may match the requesting customer to other customers in a customer population and/or match the requesting customer to the specific third-party provider and/or a specific subscription offered by the specific third-party provider. As another example, in some implementations, the customer may request to subscribe to any (e.g., non-specific) movie or television streaming service, to which the subscription management platform may match the requesting customer to other customers in the customer population, a third-party provider, and/or a subscription offered by the third-party provider to satisfy the customer's request.

As shown in FIG. 1B, and by reference number 108, the subscription management platform may receive the customer requests to opt-in and/or request enrollment in one or more subscriptions provided by the third-party providers. In some implementations, the customer preferences received by the subscription management platform in the requests may include subscription identifiers associated with subscriptions for which the customer is requesting enrollment, provider identifiers associated with the third-party providers of the subscriptions for which the customer is requesting enrollment, descriptors of personal habits or routines associated with customers making the requests to enroll in the subscriptions, or indications of a choice, selected from among a plurality of choices, by the customers making the requests to enroll in the subscriptions (e.g., preferences indicating a choice from multiple choices).

In some implementations, for example, the descriptors of personal habits or routines associated with customers making the requests to enroll in the subscriptions may include, without limitation, an average (e.g., estimated or predicted) amount of data consumed per billing cycle for a mobile phone service, an average number of minutes used per billing cycle for a mobile phone service, an average number of hours spent watching television and/or listening to music per billing cycle for a streaming service, an average amount of food consumed per billing cycle for a food delivery service, an average amount and/or value of food consumed per billing cycle for a food delivery service, an average amount of physical activity a customer may exert or wish to exert per billing cycle for a group-based gym membership, and/or the like.

Additionally, and, as an example, the customer preferences may also include indications of a choice selected from among a plurality of choices. Such indications may include, without limitation, a selection of self-identifying information, a selection of the customer's age or an age range, a selection of the customer's gender, a selection of the customer's average annual income (e.g., individual or household), a selection of the customer's number and/or ages of family members, a selection of demographic information associated with the customer, a selection of personal information associated with the customer, a selection of a preferred subscription usage (e.g., a preference for unlimited or limited data, a preference for unlimited or limited streaming, etc.), a selection of a preferred subscription enrollment, a selection of a preferred subscription payment method, and/or the like. In some implementations, the customer preferences are stored by the subscription management platform as customer data. Where stored, the customer preferences may be updated periodically, or in real-time, as desired.

In some implementations, the customer preferences may include and/or indicate information regarding the customer's existing subscriptions. For example, the customer may indicate information associated with the customer's existing mobile phone subscription or plan (e.g., number of talking minutes per month, an amount of data usage allowed per month, a cost of the subscription, etc.). The subscription management platform may then analyze the customer's preferences and recommend subscriptions to the customer based on analyzing the customer's preferences. The customer may then opt-in and/or request to be matched to other customers in a customer population, a third-party provider, and/or a new subscription based on determining a subscription that has improved features (e.g., an improved cost, improved services, etc.) compared to the customer's existing subscription.

In some implementations, the subscription management platform may additionally determine, access, obtain, and/or store, as customer data, customer account attributes. For example, in some implementations, a customer requesting to opt-in and/or enroll in a subscription may have at least one customer account associated with and/or otherwise accessible to the subscription management platform. The subscription management platform may obtain customer account attributes associated with the customer accounts. Example customer account attributes may include, for example and without limitation, a customer rating associated with a customer account, a geographic region or a time-zone associated with a billing address for the customer account, a geographic region or a time-zone associated with a mailing address for the customer account, a credit limit associated with the customer account, a customer tier-level associated with the customer account, a credit score of the customer enrolled in the customer account, and/or the like. The subscription management platform may access and/or utilize the third-party provider data and the customer data to intelligently match and/or group customers in a customer population, match and/or assign customers to subscriptions, match and/or assign customers to third-party providers, and/or enroll and pay for subscriptions on behalf of the customers. In this way, resources that would otherwise be devoted to managing individual subscriptions and/or individual accounts may be minimized and/or obviated.

As shown in FIG. 1C, and by reference number 110, the subscription management platform may match, group, and/or assign customers in the customer population to a group (e.g., a group of two or more customers), based on the customer data including, for example, customer preferences and/or the customer account attributes. The group may include, for example, customers to be enrolled in a same subscription provided by a same third-party provider. For example, and, in some implementations, the subscription management platform may utilize a model (e.g., a customer matching model) to match at least a first customer in the customer population and at least a second customer in the customer population, and assign the first and second customers to a same group associated with a group identifier. The model may be implemented and/or stored by a matching engine of and/or accessible to the subscription management platform. The customers may be matched and/or assigned to one group or more than one group, in some implementations. The different groups of customers may include different group identifiers, where each group identifier may be associated with customer identifiers that identify the customers in the group, third-party provider identifiers that identify the third-party providers offering the subscription, and/or subscription identifiers that identify the group-based subscriptions, as described herein.

In some implementations, the subscription management platform may determine, using the model, scores for the customers based on receiving, as input to the model, the customer preferences and/or the customer account attributes. In some implementations, the scores may predict a successful matching among customers in the customer population. For example, the scores may indicate a level of confidence that a first customer matches a second customer and/or that the first customer matches a group of customers. The model may use, as input, data regarding the personal routines, interests, demographics, preferences, and/or account attributes for customers in the customer population. The model may, using the customer data as input, assign a first subset of the customers in the customer population to a first group of customers based on the scores. In some implementations, the model may, using the customer data as input, assign multiple subsets of customers in the customer population to multiple groups of customers based on the scores. In this way, the subscription management platform may intelligently group customers in a large pool of customers for subscription enrollment based on thousands, millions, billions, etc., of datapoints indicating customer preferences and/or customer account attributes, the volume of which cannot be processed objectively by human actors.

In some implementations, the model implemented by the subscription management platform may be trained to identify patterns among the customers in a customer population, where the patterns may identify similarities among the customers. In this way, similar customers may be matched, grouped, and/or assigned to a same group. In this way, customers that may otherwise lack the personal connections for joining a group-based subscription may opt-in to becoming intelligently paired or grouped with other customers in the customer population to obtain a membership in the group-based subscription.

As shown by FIG. 1C, and by reference number 112, the subscription management platform may match, group, and/or assign the customers to a third-party provider and/or a subscription based on the third-party provider data (e.g., data regarding the offers and/or conditions) and/or the customer data, including the customer preferences and/or customer account attributes. In some implementations, the subscription management platform assigns the groups of customers to the third-party provider(s) and/or the subscription(s).

In some implementations, the subscription management platform may determine, using a model (e.g., a same or different customer matching model as described above), scores for the customers. The scores may predict a successful matching of the customers, individually or as a group, to one or more third-party providers and/or one or more subscriptions. For example, the scores may indicate a level of confidence that a customer or a group of customers matches a third-party provider and/or a subscription. The model may use, as input, data regarding the subscription offers, the subscription conditions, the customer preferences, and/or the customer account attributes for assigning the customers to a third-party provider and/or a subscription. In this way, customer assignments to other customers, third-party providers, and/or subscriptions may be standardized despite differences in subscription conditions and/or third-party provider requirements or constraints. Further, intelligently matching customers to third-party providers and/or subscriptions may increase the success and/or longevity associated with enrollment of customers in group-based subscriptions.

In some implementations, the models implemented by the subscription management platform may be trained based on anonymized, historic third-party provider data, customer account attributes, and/or customer preferences, where available. The scores generated based on the historic data may be retrained, corrected, and/or refined over time based on inputs associated with successful and/or unsuccessful customer matches. Such inputs may include, for example, customer and/or third-party provider ratings of the successful and/or unsuccessful customer matches. The ratings may be obtained using customer satisfaction surveys and/or third-party provider surveys aimed at evaluating successful matchings between customers in a customer population, customers to third-party providers, and/or customers to group-based subscriptions. Over time, the models may be continuously trained and/or refined to improve the intelligent matchings and/or groupings of individual customers in a customer population, customers to third-party providers, and/or customers to group-based subscriptions based on predicting successful matches among the customers, subscriptions, and/or third-party providers. Other methods of training and/or generating the models for matching customers in a customer population and/or matching customers to third-party providers and/or subscriptions are contemplated. For example, the models may be trained using training data contained in generic training data libraries, in some implementations.

As further shown by FIG. 1C, and by reference number 114, the subscription management platform may enroll one or more groups of customers in a subscription provided by a third-party provider. In some implementations, the subscription management platform may automatically enroll a group of customers in an account (e.g., using a unique account identifier, a subscription identifier, etc.) associated with a subscription provided by a first third-party provider. In some implementations, the subscription management platform may utilize electronic messaging and/or datagrams to automate the enrollment process by sending customer data, as a group or batch, to the third-party provider on behalf of the customers. In this way, computing resources that would otherwise be devoted to individually enrolling customers in a subscription may be obviated or reduced. In some implementations, customers may be enrolled in a plurality of different groups and assigned to a plurality of different subscriptions offered by a plurality of different third-party providers. In some implementations, customers may be enrolled in a single group and assigned to a single third-party provider and/or associated with a single subscription.

Figure 1D:
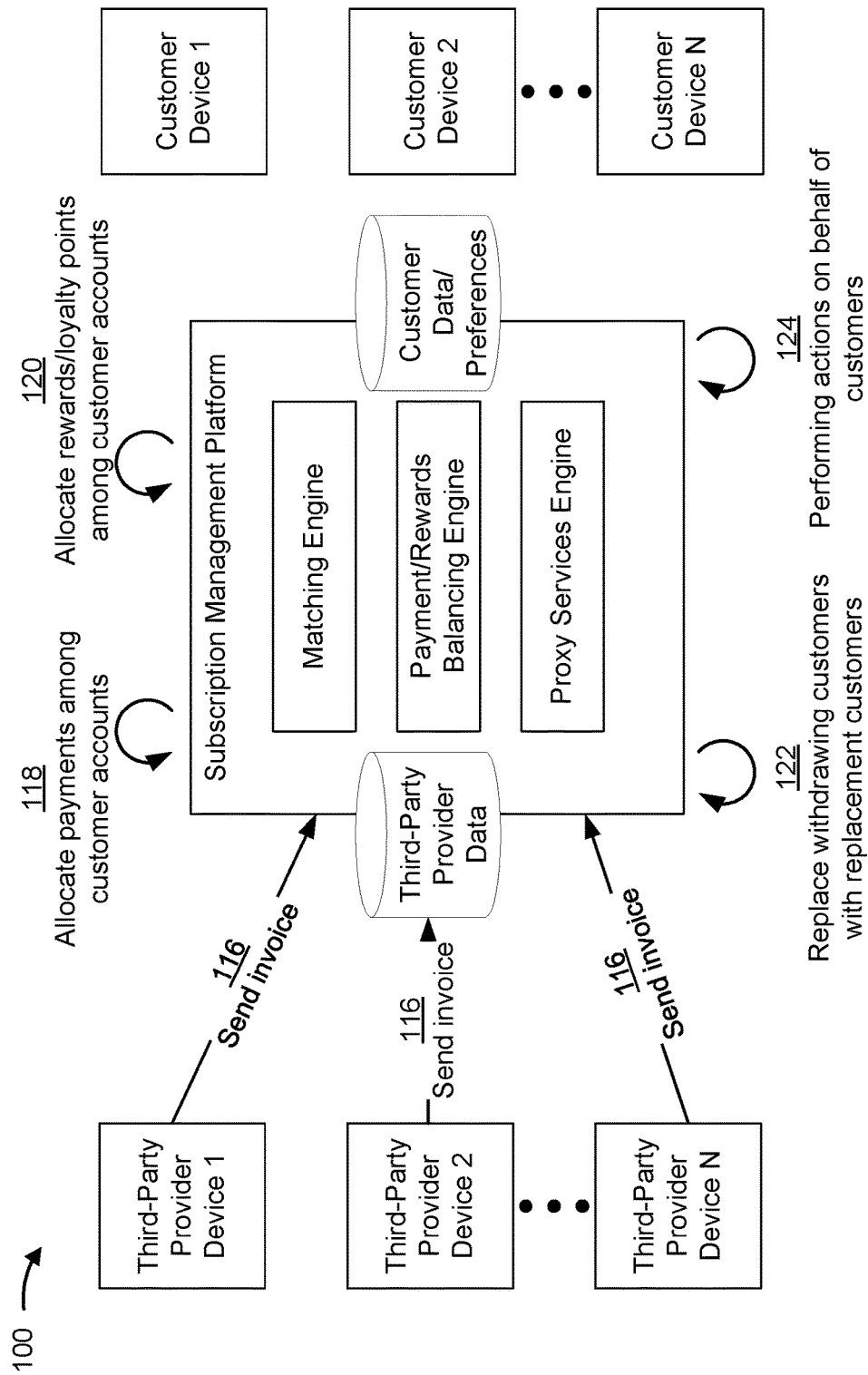

As shown by FIG. 1D, and by reference number 116, the one or more third-party providers may, using the third-party provider devices, send invoices or bills incurred by a group of customers for a subscription. For example, the one or more third-party providers may send the invoices or bills electronically, as described herein. In this way, resources that would otherwise be devoted to processing, printing, and/or mailing individual invoices may be obviated.

In some implementations, the third-party provider may transmit a single invoice to the subscription management platform for payment. In some implementations, the third-party provider transmits multiple invoices to the subscription management platform for payment, where the multiple invoices may be split into proportionate or non-proportionate amounts, as specified by the subscription terms and/or conditions.

As further shown by FIG. 1D, and by reference number 118, the subscription management platform may allocate payments for the subscriptions from among a group of customer accounts associated with a group of customers. In some implementations, the subscription management platform may submit an electronic payment to the third-party provider on behalf of the group of customers, and debit each customer account for a proportionate amount, or other amount(s), consistent with the subscription conditions and/or customer preferences. In some implementations, the subscription management platform may determine a lead customer and/or a lead customer account from among the group of customers and/or a group of customer accounts and submit an electronic payment to the third-party provider from the lead account for the subscription. For example, in some implementations, the subscription management platform may automatically determine billing amounts for the customers in the group of customers based on a total amount billed for the subscription (e.g., proportionate or non-proportionate amounts based on the subscription conditions and/or customer preferences), pay the total amount owed for the subscription using an account number associated with the lead account, debit the billing amounts from non-lead accounts identified from among the group of customer accounts, and credit the billing amounts debited from the non-lead accounts to the lead account. In this way, the customer associated with the lead account may make a single payment for the total billed amount from the lead account, and be seamlessly and/or automatically credited based on payments from the other customers. In this way, the efficiency at which the billing and payments for the subscriptions may be improved and/or automated.

In some implementations, the subscription management platform determines, based on a due date of the invoice, timing associated with various aspects of allocating the payment for the invoice. For example, in some implementations, the non-lead accounts may be debited, and the debited amounts may be credited, to the lead account, prior to or substantially simultaneous with debiting the lead account for the payment of the subscription. In this way, the lead account may avoid becoming overdrawn. In some implementations, the lead account may be credited with amounts debited from the non-lead accounts on the same day. In this way, the subscription management platform may predict a day, time, and/or amount of time associated with when the funds received from the non-lead accounts may be made available to the lead account for disbursement from the lead account for meeting the invoice due date. In this way, the subscription management platform may further predict a day, time, and/or the like associated with debiting funds from the non-lead accounts so as to be available in the lead account at the time that payment of the invoice is due to be paid. In some implementations, the lead account may be credited with the amounts debited from the non-lead accounts in advance of a day that the total payment of the subscription is paid from the lead account, that the lead account may accumulate interest and/or rewards for incentivizing and/or rewarding customers that agree to be the lead customer. In some implementations, the lead customer may pay a lower portion of the subscription than non-lead customers, where desired.

In some implementations, the lead account from the group of accounts associated with a subscription may be determined based on customer account attributes, customer preferences, or a combination thereof. For example, the subscription management platform may analyze the customer account attributes associated with the group of customer accounts and select the lead account based on the lead account having the highest tier level among the accounts, the highest credit limit among the accounts, and/or the like. Alternatively, the subscription management platform may examine the customer preferences associated with the customers in the group of customers and determine that a customer has opted-in to assuming the role of the lead account. In some implementations, the payments for the subscription may be automated by virtue of the subscription management platform having access to credit and/or debit the customer accounts. In this way, resources that would otherwise be associated with obtaining payments manually, from multiple different customers, may be reduced or obviated.

As further shown by FIG. 1D, and by reference number 120, the subscription management platform may optionally allocate rewards and/or loyalty points among the customer accounts in the group of accounts upon payment of the billed amount for the subscription. In some implementations, the rewards and/or loyalty points may be allocated based on an amount paid by a customer for a respective portion of the billed amount. In some implementations, the customer associated with the lead account may receive additional rewards and/or loyalty points compared to other customers in the subscription, for example, where the customer associated with the lead account agrees or opts-in to assuming the role of a lead customer having the lead account associated with the subscription. In this way, lead customers assuming lead roles in regard to payment of a subscription may be incentivized for opting-in to the lead roles, without having to assume liability for deficient payments made by other customers and/or without having to track down the other customers to seek reimbursement for payments made from the lead account. In some implementations, the payments, rewards, and/or loyalty points may be allocated by a payment/rewards balancing engine of and/or accessible to the subscription management platform.

As further shown by FIG. 1D, and by reference number 122, the subscription management platform may detect that one customer in a group of customers has either withdrawn from the group of customers or desires to withdraw from the group of customers and terminate the subscription. In some implementations, the subscription management platform receives, from the one customer, a request to withdraw from the group of customers. In some implementations, the subscription management platform receives a notification from the one customer and/or the third-party provider that the customer has withdrawn from the group of customers. The subscription management platform may, using a model, select a replacement customer for the group of customers from which the one customer has withdrawn. In some implementations, the subscription management platform automatically replaces the one customer with the replacement customer. In this way, other customers remaining in the group of customers may be unaware of the replacement and/or unaffected by the replacement of a customer associated with the subscription.

As further shown by FIG. 1D, and by reference number 124, the subscription management platform may perform one or more actions on behalf of the customers. In some implementations, customers may, using customer devices, interface with the subscription management platform and access a proxy services engine by which the customers may change or adjust account settings associated with the subscription. In some implementations, the settings may not affect other members in the group, for example, the customer may change the customer's contact information, payment information, and/or the like. In some implementations, customers may be locked out of changing settings that would affect the group of customers associated with the subscription. In some implementations, customers may indicate a desire to change settings (e.g., a setting that would affect a price of the subscription, a setting that would affect delivery of the service, etc.), which may affect the group. In such cases, the subscription management platform may initiate the withdrawal of a customer from one group, and may optionally add the customer to a group having settings that are consistent with the customer's desired settings or preferences.

In some implementations, the proxy services engine may include or provide an abstraction or virtual platform, layer, or network by which customers may interact with the third-party provider's platform, layer, or network. For example, the proxy services engine may provide an abstracted version of the third-party provider's website by which a customer may initiate or make changes to a subscription and/or a subscription account. As another example, the proxy services engine may provide a virtual network by which multiple customers may access services from the third-party provider using, for example, a same IP address, where, for example, a third-party provider imposes limits or constraints on the number of IP addresses by which a service may be accessed (e.g., movie streaming services may be limited to one, two, three, four, etc., network addresses). In some implementations, the customers may access the proxy services engine to register network addresses (e.g., Internet protocol (IP) addresses) associated with the subscription, so that the customers may access the subscription.

The subscription management platform described herein may automate aspects relating to subscription enrollment, billing, and/or payments. The subscription management platform may also implement intelligent customer grouping and/or matching to efficiently pair or match customers to desired subscriptions. In this way, resources that would otherwise be devoted to manually matching individual customers to a group, manually matching the groups to third-party providers, manually matching the groups to subscriptions, and/or manually managing individual subscriptions may be reduced or obviated. The subscription management platforms described herein may receive and/or analyze thousands, millions, billions, etc., of instances of electronic data, including data derived from different sources (e.g., third-party providers, financial service providers, customers, etc.), the volume of which cannot be processed objectively by human actors.

In this way, several different stages of the process for subscription matching, enrollment, management, and/or payment are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, there does not exist a technique to automate and/or standardize subscription enrollment and/or payment for multiple different subscriptions provided by multiple different third-party providers. Finally, automating the process for subscription matching, enrollment, and/or payment as described herein conserves computing resources (e.g., processor resources, memory resources, and/or the like) that would otherwise be wasted in attempting to individually enroll and pay for members of group-based subscriptions.

As indicated above, FIGS. 1A-1D are provided merely as an example. Other examples are possible and may differ from what was described with regard to FIGS. 1A-1D.

Figure 2:
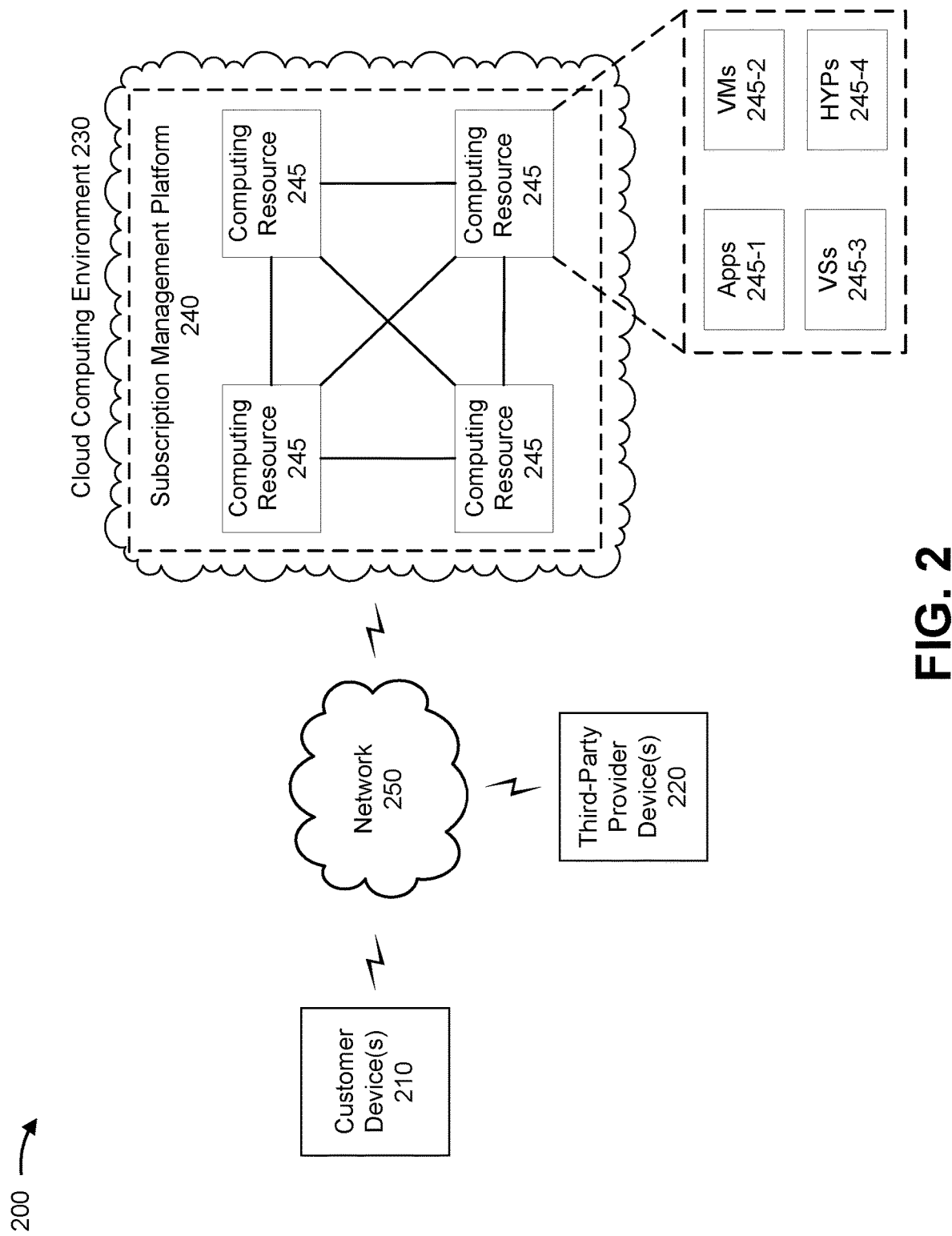
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer device 210, a third-party provider device 220, a cloud computing environment 230, a subscription management platform 240, a computing resource 245 of the cloud computing environment, and/or a network 250. Devices of environment 200 may interconnect via wired connections, wireless connections, or a combination of wired and wireless connections.

Customer device 210 may include one or more devices capable of receiving, generating, storing, processing, and/or providing information associated with obtaining, enrolling, opting-in, receiving, and/or paying for one or more group-based subscriptions. For example, customer device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Third-party provider device 220 may include one or more one or more devices capable of sending, receiving, generating, storing, processing, communicating, and/or providing third-party data, for purposes relating to intelligent grouping and automation of group-based subscriptions. For example, third-party provider device 220 may include a third-party server, a third-party computer, a third-party platform, and/or the like, that provides group-based subscriptions and/or subscription services. In various implementations, third-party provider device 220 may include a communication device and/or a computing device, such as a server device or group of server devices, a computer, a mobile phone (e.g., a smart phone, a radiotelephone, etc.), a laptop computer, a tablet computer, a handheld computer, a gaming device, a wearable communication device (e.g., a smart wristwatch, smart eyeglasses, etc.), a computing kiosk, a computing terminal, or a similar type of device. In some implementations, third-party provider device 220 may be capable of sending one or more subscription offers and/or conditions associated with group-based subscriptions available for purchase by a group of subscribers, sending invoices or bills incurred by a group for a subscription, and/or the like.

Cloud computing environment 230 may include an environment that delivers computing as a service, whereby shared resources, services, etc. may be provided to customer device 210, third-party provider device 220, subscription management platform 240, and/or the like. Cloud computing environment 230 may provide computation, software, data access, storage, and/or other services that do not require end-user knowledge of a physical location and configuration of a system and/or a device that delivers the services. As shown, cloud computing environment 230 may include subscription management platform 240 and computing resource 245 (e.g., a computer) of the cloud computing environment.

Subscription management platform 240 may include one or more devices capable of sending, receiving, generating, storing, processing, analyzing, and/or providing information relating to intelligent grouping and/or automation of group-based subscriptions. For example, subscription management platform 240 may include a server device (e.g., a host server, a web server, an application server, etc.), a data center device, or a similar device. In some implementations, subscription management platform 240 may receive offers and/or conditions from one or more third-party provider devices 220, and may store the offers and/or conditions. In some implementations, subscription management platform 240 may receive, from customer device 210, messages for opting-in and/or requesting enrollment in subscriptions, may assign customers to a group, to a third-party provider, and/or to a group-based subscription, may enroll groups of customers in a group-based subscription, and/or the like. In some implementations, subscription management platform 240 may receive invoices or bills incurred by a group of customers associated with a subscription, may allocate payments among customer accounts, may allocate rewards and/or loyalty points among customer accounts, may replace withdrawing customers with replacement customers, may perform actions on behalf of customers, and/or the like.

In some implementations, as shown, subscription management platform 240 may be hosted in cloud computing environment 230. While implementations described herein describe subscription management platform 240 as being hosted in cloud computing environment 230, in some implementations, subscription management platform 240 might not be cloud-based (i.e., may be implemented outside of a cloud computing environment 230) or might be partially cloud-based.

Computing resource 245 includes one or more personal computers, workstation computers, server devices, or another type of computation and/or communication device. In some implementations, computing resource 245 is a computing resource of cloud computing environment 230, which may host subscription management platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by customer device 210 and/or third-party provider device 220. Application 245-1 may eliminate a need to install and execute the software applications on customer device 210 and/or third-party provider device 220. For example, application 245-1 may include software associated with subscription management platform 240 and/or any other software capable of being provided via cloud computing environment 230. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., using customer device 210), and may manage infrastructure of cloud computing environment 230, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
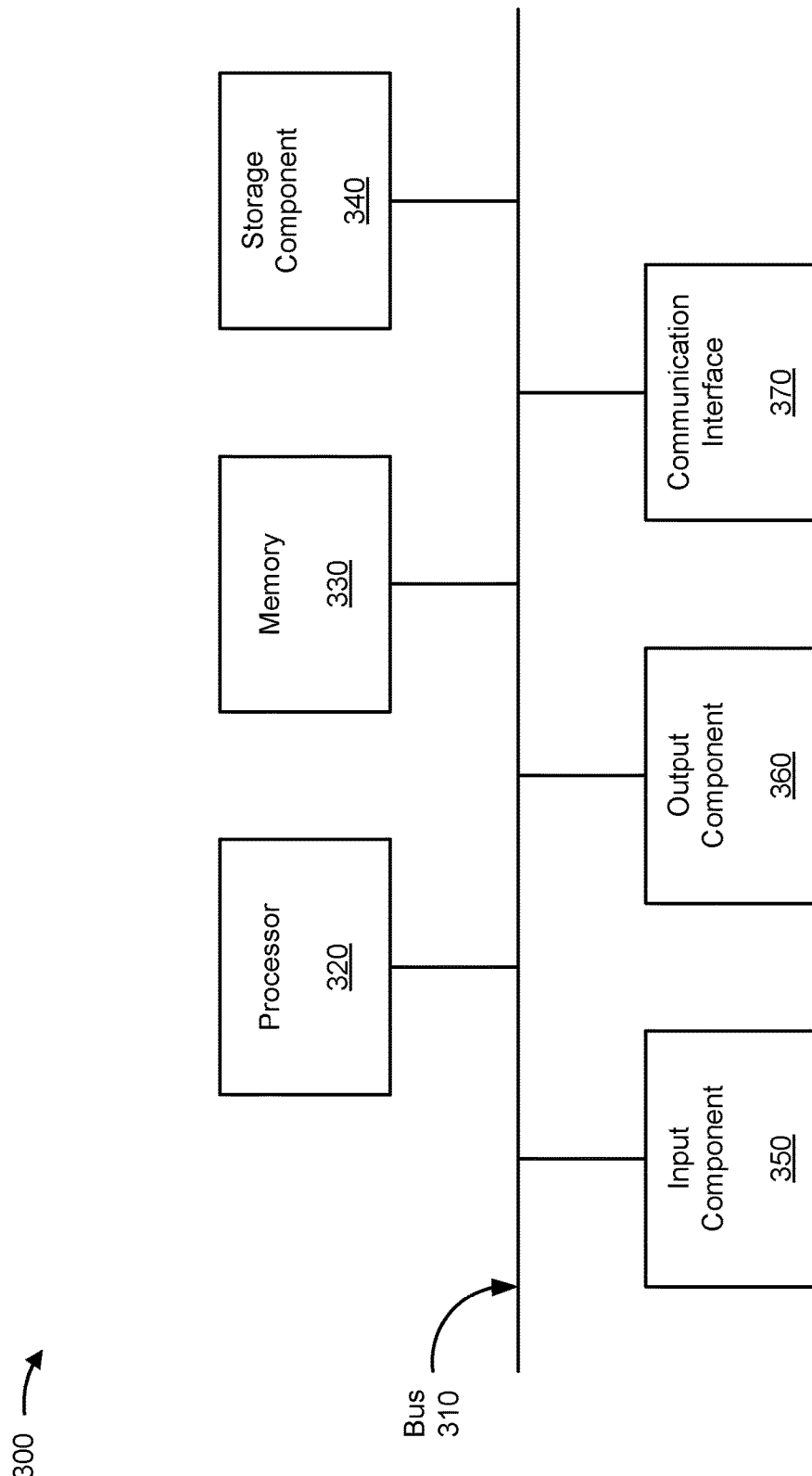
FIG. 3 is a diagram of example components of one or more devices of FIG. 2.

FIG. 3 is a diagram of example components of a device 300. Device 300 may correspond to customer device 210, third-party provider device 220, subscription management platform 240, and/or computing resource 245 of subscription management platform 240. In some implementations, customer device 210, third-party provider device 220, subscription management platform 240, and/or computing resource 245 of subscription platform 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a Skeypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
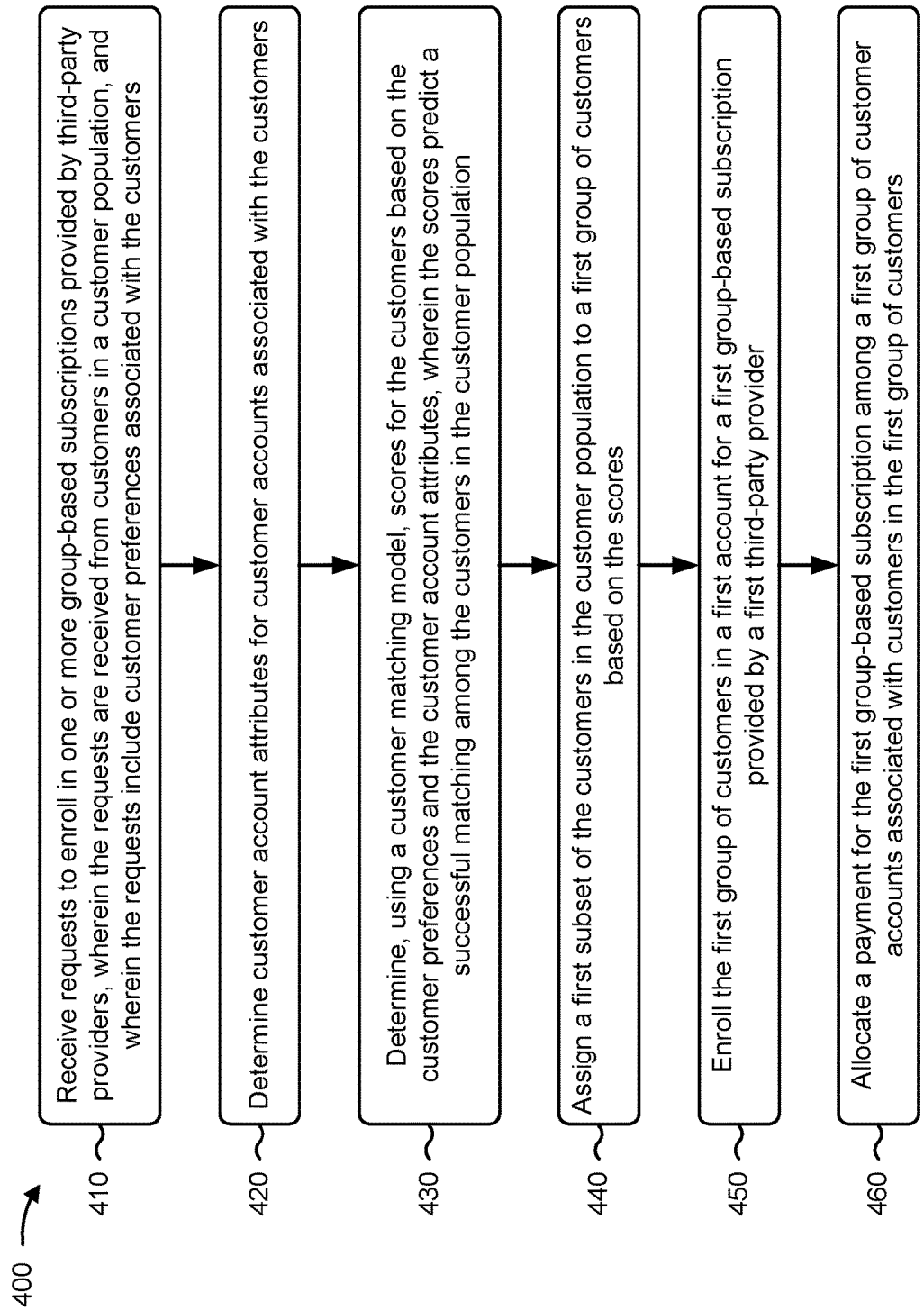
FIG. 4 is a flow chart of an example process for intelligent grouping and automation of group-based subscriptions.

FIG. 4 is a flow chart of an example process 400 for intelligent grouping and automation of group-based subscriptions. In some implementations, one or more process blocks of FIG. 4 may be performed by a subscription management platform (e.g., subscription management platform 240), which may include a computing resource of a cloud computing environment. In some implementations, one or more process blocks of FIG. 4 may be performed by another device or a group of devices separate from or including subscription management platform (e.g., subscription management platform 240), such as a customer device (e.g., customer device 210) and/or a third-party provider device (e.g., third-party provider device 220).

As shown in FIG. 4, process 400 may include receiving requests to enroll in one or more group-based subscriptions provided by third-party providers, wherein the requests are received from customers in a customer population, and wherein the requests include customer preferences associated with the customers (block 410). For example, the subscription management platform (e.g., using computing resource 245, processor 320, memory 330, storage component 340, input component 350, communication interface 370, and/or the like) may receive requests to enroll in one or more group-based subscriptions provided by third-party providers, as described above in connection with FIGS. 1A-1D. In some implementations, the requests may be received from customers in a customer population. In some implementations, the requests may include customer preferences associated with the customers.

As further shown in FIG. 4, process 400 may include determining customer account attributes for customer accounts associated with the customers (block 420). For example, the subscription management platform (e.g., using computing resource 245, processor 320, memory 330, storage component 340, and/or the like) may determine customer account attributes for customer accounts associated with the customers, as described above in connection with FIGS. 1A-1D.

As further shown in FIG. 4, process 400 may include determining, using a customer matching model, scores for the customers based on the customer preferences and the customer account attributes, wherein the scores predict a successful matching among the customers in the customer population (block 430). For example, the subscription management platform (e.g., using computing resource 245, processor 320, memory 330, storage component 340, communication interface 370, and/or the like) may determine, using a customer matching model, scores for the customers based on the customer preferences and the customer account attributes, as described above in connection with FIGS. 1A-1D. In some implementations, the scores may predict a successful matching among the customers in the customer population.

As further shown in FIG. 4, process 400 may include assigning a first subset of the customers in the customer population to a first group of customers based on the scores (block 440). For example, the subscription management platform (e.g., using computing resource 245, processor 320, memory 330, storage component 340, communication interface 370, and/or the like) may assign a first subset of the customers in the customer population to a first group of customers based on the scores, as described above in connection with FIGS. 1A-1D.

As further shown in FIG. 4, process 400 may include enrolling the first group of customers in a first account for a first group-based subscription provided by a first third-party provider (block 450). For example, the subscription management platform (e.g., using computing resource 245, processor 320, memory 330, storage component 340, input component 350, output component 360, communication interface 370, and/or the like) may enroll the first group of customers in a first account for a first group-based subscription provided by a first third-party provider, as described above in connection with FIGS. 1A-1D.

As further shown in FIG. 4, process 400 may include allocating a payment for the first group-based subscription among a first group of customer accounts associated with customers in the first group of customers (block 460). For example, the subscription management platform (e.g., using computing resource 245, processor 320, memory 330, storage component 340, input component 350, output component 360, communication interface 370, and/or the like) may allocate a payment for the first group-based subscription among a first group of customer accounts associated with customers in the first group of customers, as described above in connection with FIGS. 1A-1D.

Process 400 may include additional implementations, such as any single implementation or any combination of implementations described below and/or in connection with one or more other processes described elsewhere herein.

In some implementations, when allocating the payment, the subscription management platform may determine proportionate billing amounts for the customers in the first group of customers based on a total billed amount for the first group-based subscription, may pay the total billed amount for the first group-based subscription using an account number associated with a lead account identified from among the first group of customer accounts, may debit the proportionate billing amounts from non-lead accounts identified from among the first group of customer accounts, and may credit the proportionate billing amounts debited from the non-lead accounts to the lead account.

In some implementations, the customer preferences associated with a request to enroll in a group-based subscription may include a subscription identifier associated with the group-based subscription, a provider identifier associated with a third-party provider of the group-based subscription, a descriptor of a personal routine associated with a customer making the request to enroll in the group-based subscription, and/or an indication of a choice, selected from among a plurality of choices, by the customer making the request to enroll in the group-based subscription.

In some implementations, the customer account attributes for a customer account may include a customer rating associated with the customer account, a first geographic region or a first time-zone associated with a billing address for the customer account, a second geographic region or a second time-zone associated with a mailing address for the customer account, a credit limit associated with the customer account, a customer tier-level associated with the customer account, and/or a credit score of a customer enrolled in the customer account.

In some implementations, the subscription management platform may receive, from one customer in the first group of customers, a request to withdraw from the first group of customers, may select, using the customer matching model, a replacement customer for the first group of customers, and may automatically replace, in the first group of customers, the one customer with the replacement customer. In some implementations, the subscription management platform may allocate a distribution of rewards or loyalty points for enrollment in the first group-based subscription among the first group of customer accounts.

In some implementations, the subscription management platform may assign a second subset of the customers in the customer population to a second group of customers based on the scores, and may enroll the second group of customers in a second account for the first group-based subscription provided by the first third-party provider. In some implementations, the subscription management platform may assign a second subset of the customers in the customer population to a second group of customers based on the scores, and may enroll the second group of customers in a first account for a second group-based subscription provided by a second third-party provider.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
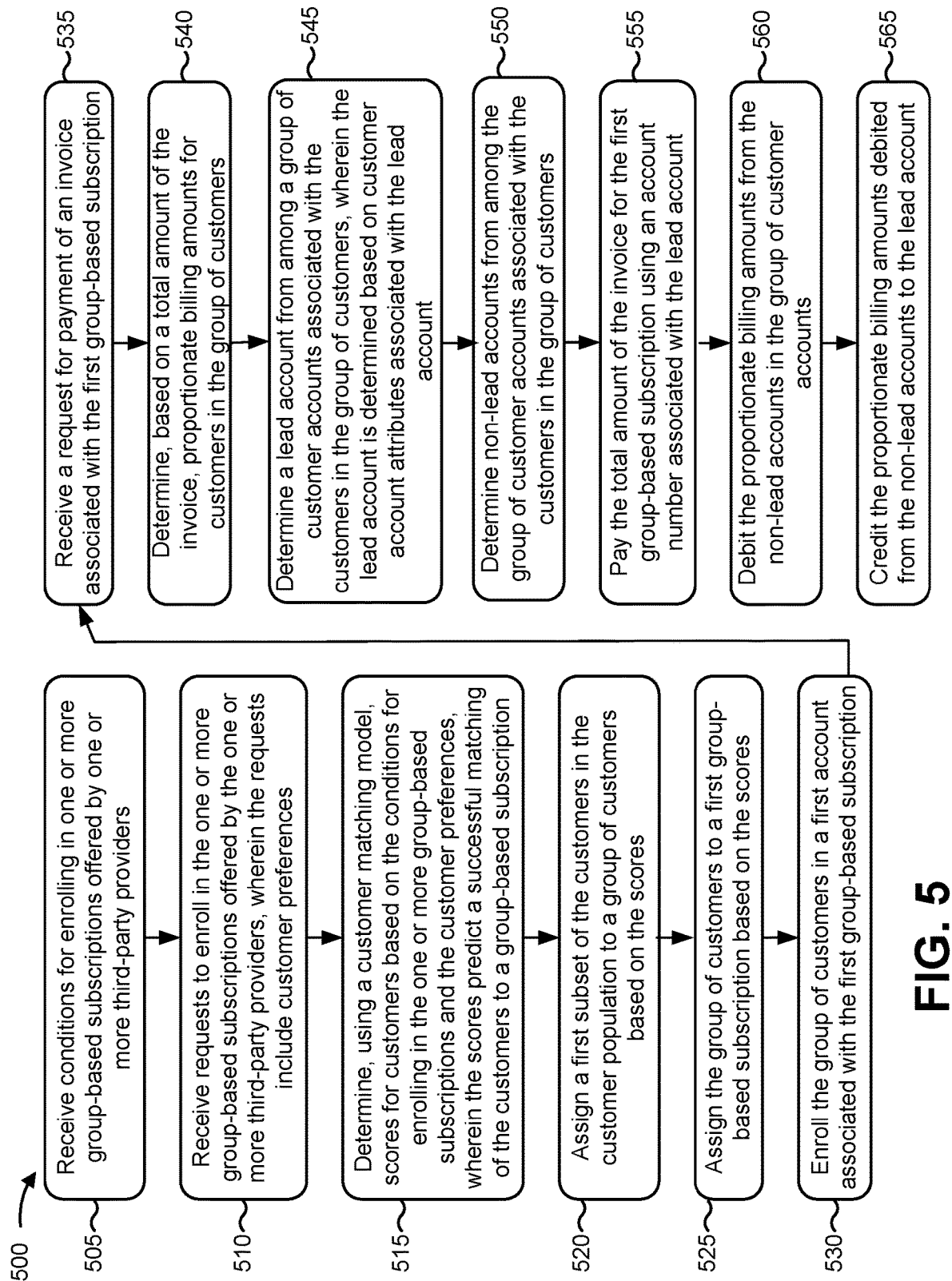
FIG. 5 is a flow chart of an example process for intelligent grouping and automation of group-based subscriptions.

FIG. 5 is a flow chart of an example process 500 for intelligent grouping and automation of group-based subscriptions. In some implementations, one or more process blocks of FIG. 5 may be performed by a subscription management platform (e.g., subscription management platform 240). In some implementations, one or more process blocks of FIG. 5 may be performed by another device or a group of devices separate from or including subscription management platform (e.g., subscription management platform 240), such as a customer device (e.g., customer device 210) and/or a third-party provider device (e.g., third-party provider device 220).

As shown in FIG. 5, process 500 may include receiving, from one or more third-party providers, conditions for enrolling in one or more group-based subscriptions offered by the one or more third-party providers (block 505). For example, the subscription management platform (e.g., using computing resource 245, processor 320, memory 330, stor- age component 340, input component 350, communication interface 370, and/or the like) may receive, from one or more third-party providers, conditions for enrolling in one or more group-based subscriptions offered by the one or more third-party providers, as described above in connection with FIGS. 1A-1D.

As further shown in FIG. 5, process 500 may include receiving, from customers in a customer population, requests to enroll in the one or more group-based subscriptions offered by the one or more third-party providers, wherein the requests include customer preferences (block 510). For example, the subscription management platform (e.g., using computing resource 245, processor 320, memory 330, storage component 340, input component 350, communication interface 370, and/or the like) may receive, from customers in a customer population, requests to enroll in the one or more group-based subscriptions offered by the one or more third-party providers, as described above in connection with FIGS. 1A-1D. In some implementations, the requests may include customer preferences.

As further shown in FIG. 5, process 500 may include determining, using a customer matching model, scores for the customers based on the conditions for enrolling in the one or more group-based subscriptions and the customer preferences, wherein the scores predict a successful matching of the customers to a group-based subscription (block 515). For example, the subscription management platform (e.g., using computing resource 245, processor 320, memory 330, storage component 340, and/or the like) may determine, using a customer matching model, scores for the customers based on the conditions for enrolling in the one or more group-based subscriptions and the customer preferences, as described above in connection with FIGS. 1A-1D. In some implementations, the scores may predict a successful matching of the customers to a group-based subscription.

As further shown in FIG. 5, process 500 may include assigning a first subset of the customers in the customer population to a group of customers based on the scores (block 520). For example, the subscription management platform (e.g., using computing resource 245, processor 320, memory 330, storage component 340, and/or the like) may assign a first subset of the customers in the customer population to a group of customers based on the scores, as described above in connection with FIGS. 1A-1D.

As further shown in FIG. 5, process 500 may include assigning the group of customers to a first group-based subscription based on the scores (block 525). For example, the subscription management platform (e.g., using computing resource 245, processor 320, memory 330, storage component 340, and/or the like) may assign the group of customers to a first group-based subscription based on the scores, as described above in connection with FIGS. 1A-1D.

As further shown in FIG. 5, process 500 may include enrolling the group of customers in a first account associated with the first group-based subscription (block 530). For example, the subscription management platform (e.g., using computing resource 245, processor 320, memory 330, storage component 340, input component 350, output component 360, communication interface 370, and/or the like) may enroll the group of customers in a first account associated with the first group-based subscription, as described above in connection with FIGS. 1A-1D.

As further shown in FIG. 5, process 500 may include receiving a request for payment of an invoice associated with the first group-based subscription (block 535). For example, the subscription management platform (e.g., using computing resource 245, processor 320, memory 330, storage component 340, input component 350, communication interface 370, and/or the like) may receive a request for payment of an invoice associated with the first group-based subscription, as described above in connection with FIGS. 1A-1D.

As further shown in FIG. 5, process 500 may include determining, based on a total amount of the invoice, proportionate billing amounts for customers in the group of customers (block 540). For example, the subscription management platform (e.g., using computing resource 245, processor 320, memory 330, storage component 340, and/or the like) may determine, based on a total amount of the invoice, proportionate billing amounts for customers in the group of customers, as described above in connection with FIGS. 1A-1D.

As further shown in FIG. 5, process 500 may include determining a lead account from among a group of customer accounts associated with the customers in the group of customers, wherein the lead account is determined based on customer account attributes associated with the lead account (block 545). For example, the subscription management platform (e.g., using computing resource 245, processor 320, memory 330, storage component 340, and/or the like) may determine a lead account from among a group of customer accounts associated with the customers in the group of customers, as described above in connection with FIGS. 1A-1D. In some implementations, the lead account may be determined based on customer account attributes associated with the lead account.

As further shown in FIG. 5, process 500 may include determining non-lead accounts from among the group of customer accounts associated with the customers in the group of customers (block 550). For example, the subscription management platform (e.g., using computing resource 245, processor 320, memory 330, storage component 340, and/or the like) may determine non-lead accounts from among the group of customer accounts associated with the customers in the group of customers, as described above in connection with FIGS. 1A-1D.

As further shown in FIG. 5, process 500 may include paying the total amount of the invoice for the first group-based subscription using an account number associated with the lead account (block 555). For example, the subscription management platform (e.g., using computing resource 245, processor 320, memory 330, storage component 340, input component 350, output component 360, communication interface 370, and/or the like) may pay the total amount of the invoice for the first group-based subscription using an account number associated with the lead account, as described above in connection with FIGS. 1A-1D.

As further shown in FIG. 5, process 500 may include debiting the proportionate billing amounts from the non-lead accounts in the group of customer accounts (block 560). For example, the subscription management platform (e.g., using computing resource 245, processor 320, memory 330, storage component 340, input component 350, output component 360, communication interface 370, and/or the like) may debit the proportionate billing amounts from the non-lead accounts in the group of customer accounts, as described above in connection with FIGS. 1A-1D.

As further shown in FIG. 5, process 500 may include crediting the proportionate billing amounts debited from the non-lead accounts to the lead account (block 565). For example, the subscription management platform (e.g., using computing resource 245, processor 320, memory 330, storage component 340, input component 350, output component 360, communication interface 370, and/or the like) may credit the proportionate billing amounts debited from the non-lead accounts to the lead account, as described above in connection with FIGS. 1A-1D.

Process 500 may include additional implementations, such as any single implementation or any combination of implementations described below and/or in connection with one or more other processes described elsewhere herein.

In some implementations, the customer account attributes may include a customer rating associated with the lead account, a credit limit associated with the lead account, a customer tier-level associated with the lead account, a credit score of a lead customer associated with the lead account, and/or an indication that the lead customer associated with the lead account has opted-in to serving as the lead account. In some implementations, the group of customer accounts may include a group of credit card accounts, a group of checking accounts, a group of savings accounts, a group of money-market accounts, or a combination thereof.

In some implementations, the scores may indicate a measure of confidence that satisfies a threshold. In some implementations, the subscription management platform may allow a customer in the group of customers to adjust a setting associated with the first account for the first group-based subscription. In some implementations, the subscription management platform may allow a customer in the group of customers to register customer Internet protocol (IP) addresses associated with the first account for the first group-based subscription.

In some implementations, the subscription management platform may assign the group of customers to a second group-based subscription based on the scores. In some implementations, the first group-based subscription may be provided by a first third-party service provider. In some implementations, the second group-based subscription may be provided by a second third-party service provider. In some implementations, the subscription management platform may enroll the group of customers in a second account associated with the second group-based subscription.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 400 may be performed in parallel.

Figure 6:
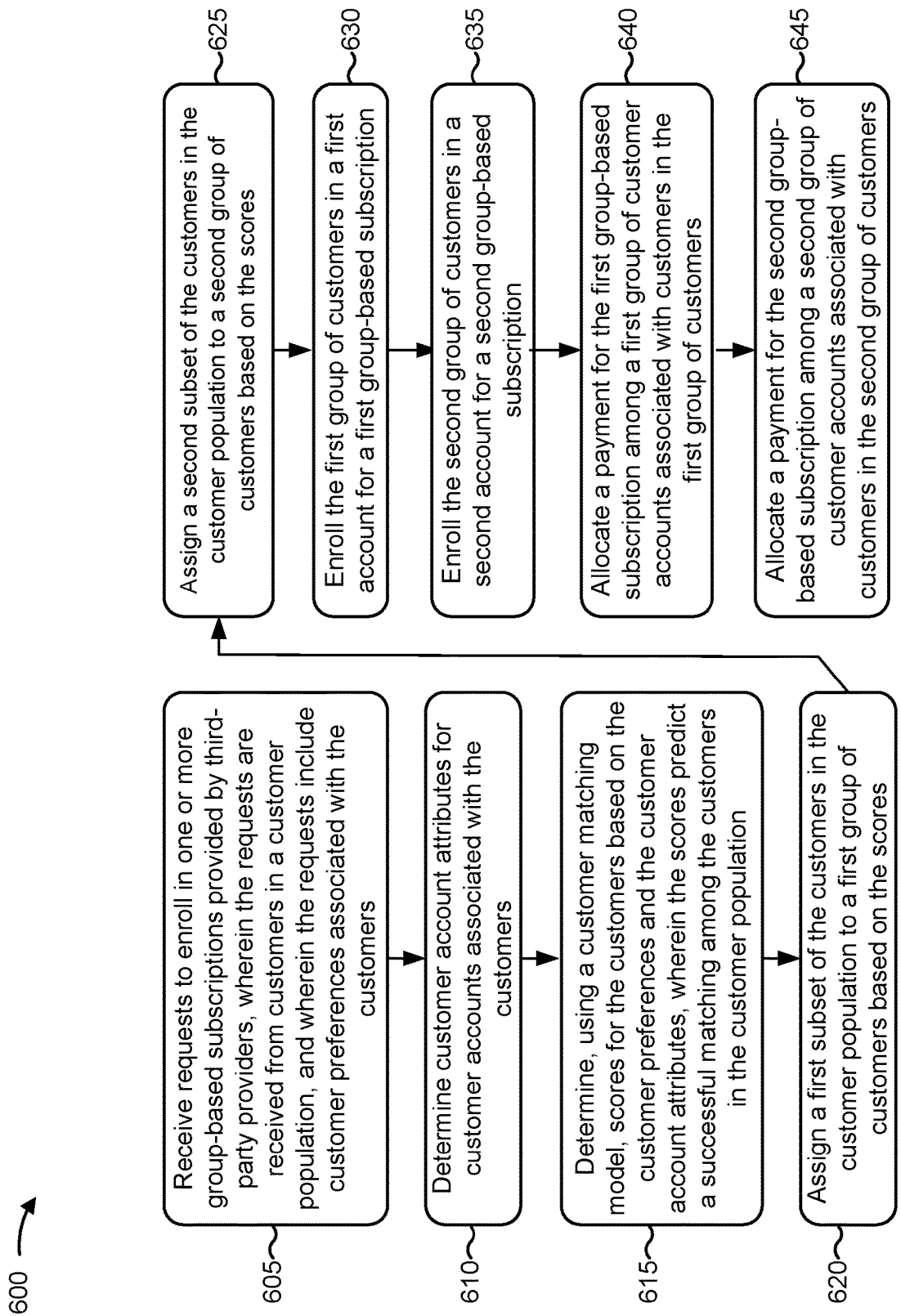
FIG. 6 is a flow chart of an example process for intelligent grouping and automation of group-based subscriptions.

FIG. 6 is a flow chart of an example process 600 for intelligent grouping and automation of group-based subscriptions. In some implementations, one or more process blocks of FIG. 6 may be performed by a subscription management platform (e.g., subscription management platform 240). In some implementations, one or more process blocks of FIG. 6 may be performed by another device or a group of devices separate from or including subscription management platform (e.g., subscription management platform 240), such as a customer device (e.g., customer device 210) and/or a third-party provider device (e.g., third-party provider device 220).

As shown in FIG. 6, process 600 may include receiving requests to enroll in one or more group-based subscriptions provided by third-party providers, wherein the requests are received from customers in a customer population, and wherein the requests include customer preferences associated with the customers (block 605). For example, the subscription management platform (e.g., using computing resource 245, processor 320, memory 330, storage component 340, input component 350, communication interface 370, and/or the like) may receive requests to enroll in one or more group-based subscriptions provided by third-party providers, as described above in connection with FIGS. 1A-1D. In some implementations, the requests may be received from customers in a customer population. In some implementations, the requests may include customer preferences associated with the customers.

As further shown in FIG. 6, process 600 may include determining customer account attributes for customer accounts associated with the customers (block 610). For example, the subscription management platform (e.g., using computing resource 245, processor 320, memory 330, storage component 340, and/or the like) may determine customer account attributes for customer accounts associated with the customers, as described above in connection with FIGS. 1A-1D.

As further shown in FIG. 6, process 600 may include determining, using a customer matching model, scores for the customers based on the customer preferences and the customer account attributes, wherein the scores predict a successful matching among the customers in the customer population (block 615). For example, the subscription management platform (e.g., using computing resource 245, processor 320, memory 330, storage component 340, and/or the like) may determine, using a customer matching model, scores for the customers based on the customer preferences and the customer account attributes, as described above in connection with FIGS. 1A-1D. In some implementations, the scores may predict a successful matching among the customers in the customer population.

As further shown in FIG. 6, process 600 may include assigning a first subset of the customers in the customer population to a first group of customers based on the scores (block 620). For example, the subscription management platform (e.g., using computing resource 245, processor 320, memory 330, storage component 340, and/or the like) may assign a first subset of the customers in the customer population to a first group of customers based on the scores, as described above in connection with FIGS. 1A-1D.

As further shown in FIG. 6, process 600 may include assigning a second subset of the customers in the customer population to a second group of customers based on the scores (block 625). For example, the subscription management platform (e.g., using computing resource 245, processor 320, memory 330, storage component 340, and/or the like) may assign a second subset of the customers in the customer population to a second group of customers based on the scores, as described above in connection with FIGS. 1A-1D.

As further shown in FIG. 6, process 600 may include enrolling the first group of customers in a first account for a first group-based subscription (block 630). For example, the subscription management platform (e.g., using computing resource 245, processor 320, memory 330, storage component 340, input component 350, output component 360, communication interface 370, and/or the like) may enroll the first group of customers in a first account for a first group-based subscription, as described above in connection with FIGS. 1A-1D.

As further shown in FIG. 6, process 600 may include enrolling the second group of customers in a second account for a second group-based subscription (block 635). For example, the subscription management platform (e.g., using computing resource 245, processor 320, memory 330, storage component 340, input component 350, output component 360, communication interface 370, and/or the like) may enroll the second group of customers in a second account for a second group-based subscription, as described above in connection with FIGS. 1A-1D.

As further shown in FIG. 6, process 600 may include allocating a payment for the first group-based subscription among a first group of customer accounts associated with customers in the first group of customers (block 640). For example, the subscription management platform (e.g., using computing resource 245, processor 320, memory 330, storage component 340, input component 350, output component 360, communication interface 370, and/or the like) may allocate a payment for the first group-based subscription among a first group of customer accounts associated with customers in the first group of customers, as described above in connection with FIGS. 1A-1D.

As further shown in FIG. 6, process 600 may include allocating a payment for the second group-based subscription among a second group of customer accounts associated with customers in the second group of customers (block 645). For example, the subscription management platform (e.g., using computing resource 245, processor 320, memory 330, storage component 340, input component 350, output component 360, communication interface 370, and/or the like) may allocate a payment for the second group-based subscription among a second group of customer accounts associated with customers in the second group of customers, as described above in connection with FIGS. 1A-1D.

Process 600 may include additional implementations, such as any single implementation or any combination of implementations described below and/or in connection with one or more other processes described elsewhere herein.

In some implementations, the first group-based subscription may be provided by a first third-party provider, and the second group-based subscription may be provided by the first third-party provider. In some implementations, the first group-based subscription may be provided by a first third-party provider, and the second group-based subscription may be provided by a second third-party provider.

In some implementations, the subscription management platform may determine first proportionate billing amounts for the customers in the first group of customers based on a first total billed amount for the first group-based subscription, determine second proportionate billing amounts for the customers in the second group of customers based on a second total billed amount for the second group-based subscription, pay the first total billed amount for the first group-based subscription using a first account number associated with a first lead account identified from among the first group of customer accounts, pay the second total billed amount for the second group-based subscription using a second account number associated with a second lead account identified from among the second group of customer accounts, debit the first proportionate billing amounts from a first plurality of non-lead accounts identified from among the first group of customer accounts, debit the second proportionate billing amounts from a second plurality of non-lead accounts identified from among the second group of customer accounts, credit the first proportionate billing amounts debited from the first plurality of non-lead accounts to the first lead account, and credit the second proportionate billing amounts debited from the second plurality of non-lead accounts to the second lead account.

In some implementations, the subscription management platform may assign a third subset of the customers in the customer population to a third group of customers based on the scores, and may enroll the third group of customers in a third account for a third group-based subscription.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a flexible, scalable, and intelligent subscription management platform 240, which is configured to analyze a large volume of data and intelligently group a provider's existing customers for enrollment in and/or the purchase of a group-based subscription based on the data. Subscription management platform 240 may additionally automate aspects relating to the enrollment of customers in the group-based subscription and/or the payment of the group-based subscription by the customers. In this way, subscription management platform 240 may improve the efficiency at which group-based subscriptions are implemented, while conserving computing resources (e.g., processors, memories, etc.) that would otherwise be consumed by efforts to offer, enroll, and/or arrange payments for the group-based subscriptions. In this way, the enrollment and payment of group-based subscriptions may be standardized for many different types of group-based subscriptions, despite variances in the terms of the group-based subscriptions and/or constraints imposed by the third-party providers (i.e., merchants) offering the group-based subscriptions. Furthermore, subscription management platform 240 may receive and analyze thousands, millions, billions, or more instances of data (e.g., group-based subscription offer and/or condition data, customer data, customer account data, and/or the like), for managing and/or automating aspects relating to the provision and/or implementation of group-based subscriptions, the volume of which cannot be processed objectively by human actors.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a computing resource of a cloud computing environment and from a plurality of third-party providers, conditions for enrolling in different types of group-based subscriptions provided by the plurality of third-party providers;
receiving, by the computing resource of the cloud computing environment, requests to enroll in one or more group-based subscriptions provided by the plurality of third-party providers,
wherein the requests are received from devices of customers, in a customer population, via a subscription management platform standardized for the different types of group-based subscriptions provided by the plurality of third-party providers,
wherein the requests include customer preferences associated with the customers, and
wherein each request, of the requests, requests a respective customer, of the customers, be enrolled in the one or more group-based subscriptions;
determining, by the computing resource of the cloud computing environment, customer account attributes for customer accounts associated with the customers;
determining, by the computing resource of the cloud computing environment, and, using a customer matching model, scores for the customers based on the customer preferences, the customer account attributes, and the conditions for enrolling in the different types of group-based subscriptions provided by the plurality of third-party providers,
wherein the scores predict a successful matching among the customers in the customer population;

assigning, by the computing resource of the cloud computing environment, a first subset of the customers to a first group of customers based on the scores;

automatically enrolling, by the computing resource of the cloud computing environment, the first group of customers in a shared account for a first group-based subscription, of a first type of group-based subscription of the different types of the group-based subscriptions, provided by a first third-party provider of the plurality of third-party providers, wherein each customer, of the customers in the first group of customers that is enrolled in the shared account for the first group-based subscription, is associated with a separate request to enroll in the one or more group-based subscriptions, and wherein automatically enrolling the first group of customers includes sending batched customer data, for the first group of customers, to the first third-party provider that satisfies conditions for enrolling in the first type of group-based subscription;

allocating, by the computing resource of the cloud computing environment, a payment for the first group-based subscription among a first group of customer accounts associated with the customers in the first group of customers; and providing, by the computing resource of the cloud computing environment and via the subscription management platform, an abstracted version of a website of the first third-party provider by which the group of customers interact with a platform of the first third-party and access the shared account.

2. The method of claim 1, wherein allocating the payment comprises:

determining proportionate billing amounts for the customers in the first group of customers based on a total billed amount for the first group-based subscription;

paying the total billed amount for the first group-based subscription using an account number associated with a lead account identified from among the first group of customer accounts;

debiting the proportionate billing amounts from non-lead accounts identified from among the first group of customer accounts; and crediting the proportionate billing amounts debited from the non-lead accounts to the lead account.

3. The method of claim 1, wherein the customer preferences associated with a request to enroll in a group-based subscription include:

a subscription identifier associated with the group-based subscription, a provider identifier associated with a third-party provider of the group-based subscription, a descriptor of a personal routine associated with a customer making the request to enroll in the group-based subscription, or an indication of a choice, selected from among a plurality of choices, by the customer making the request to enroll in the group-based subscription.

4. The method of claim 1, wherein the customer account attributes for a customer account include:

a customer rating associated with the customer account, a first geographic region or a first time-zone associated with a billing address for the customer account, a second geographic region or a second time-zone associated with a mailing address for the customer account, a credit limit associated with the customer account, a customer tier-level associated with the customer account, or a credit score of a customer enrolled in the customer account.

5. The method of claim 1, further comprising:

receiving, from one customer in the first group of customers, a request to withdraw from the first group of customers;

selecting, using the customer matching model, a replacement customer for the first group of customers; and automatically replacing, in the first group of customers, the one customer with the replacement customer.

6. The method of claim 1, further comprising:

allocating a distribution of rewards or loyalty points for enrollment in the first group-based subscription among the first group of customer accounts.

7. The method of claim 1, further comprising:

assigning a second subset of the customers in the customer population to a second group of customers based on the scores; and enrolling the second group of customers in a second account for the first group-based subscription provided by the first third-party provider.

8. The method of claim 1, further comprising:

assigning a second subset of the customers in the customer population to a second group of customers based on the scores; and enrolling the second group of customers in a first account for a second group-based subscription provided by a second third-party provider.

9. A device, comprising:

one or more memories; and one or more processors, communicatively coupled to the one or more memories, to:

receive, from one or more third-party providers, conditions for enrolling in one or more group-based subscriptions offered by the one or more third-party providers;

receive, from devices of customers in a customer population and via a subscription management platform standardized for different types of the group-based subscriptions provided by the one or more third-party providers, requests to enroll in the one or more group-based subscriptions offered by the one or more third-party providers, wherein the requests include customer preferences, and wherein each request, of the requests, requests a respective customer, of the customers, be enrolled in the one or more group-based subscriptions;

determine, using a customer matching model, scores for the customers based on the conditions for enrolling in the different types of the group-based subscriptions provided by the one or more third-party providers, and the customer preferences, wherein the scores predict a successful matching of the customers to a group-based subscription;

assign a first subset of the customers in the customer population to a group of customers based on the scores;

assign the group of customers to a first group-based subscription based on the scores;

automatically enroll the group of customers in a shared account associated with the first group-based subscription, of a first type of group-based subscription of the different types of the group-based subscriptions, provided by a first third-party provider of the one or more third-party providers,
wherein each customer, of the customers in the group of customers that is enrolled in the shared account associated with the first group-based subscription, is associated with a separate request to enroll in the one or more group-based subscriptions, and
wherein the one or more processors, when automatically enrolling the group of customers, are to:
send batched customer data, for the group of customers, to a first third-party provider that satisfies conditions for enrolling in the first type of group-based subscription;
provide, via the subscription management platform, an abstracted version of a website of the first third-party provider by which the group of customers interact with a platform of the first third-party and access the shared account;
receive a request for payment of an invoice associated with the first group-based subscription;
determine, based on a total amount of the invoice, proportionate billing amounts for customers in the group of customers;
determine a lead account from among a group of customer accounts associated with the customers in the group of customers,
wherein the lead account is determined based on customer account attributes associated with the lead account;
determine non-lead accounts from among the group of customer accounts associated with the customers in the group of customers;
pay the total amount of the invoice for the first group-based subscription using an account number associated with the lead account;
debit the proportionate billing amounts from the non-lead accounts in the group of customer accounts; and
credit the proportionate billing amounts debited from the non-lead accounts to the lead account.

10. The device of claim 9, wherein the customer account attributes include:
a customer rating associated with the lead account,
a credit limit associated with the lead account,
a customer tier-level associated with the lead account,
a credit score of a lead customer associated with the lead account, or
an indication that the lead customer associated with the lead account has opted-in to serving as the lead account.

11. The device of claim 9, wherein the group of customer accounts include a group of credit card accounts, a group of checking accounts, a group of savings accounts, a group of money-market accounts, or a combination thereof.

12. The device of claim 9, wherein the scores indicate a measure of confidence that satisfies a threshold.

13. The device of claim 9, wherein the one or more processors are further configured to:
allow a customer in the group of customers to adjust a setting associated with the shared account for the first group-based subscription.

14. The device of claim 9, wherein the one or more processors are further configured to:
allow a customer in the group of customers to register customer Internet protocol (IP) addresses associated with the shared account for the first group-based subscription.

15. The device of claim 9, wherein the one or more processors are further configured to:
assign the group of customers to a second group-based subscription based on the scores,
wherein the first group-based subscription is provided by a first third-party service provider, and
wherein the second group-based subscription is provided by a second third-party service provider; and
enroll the group of customers in a second account associated with the second group-based subscription.

16. A non-transitory computer-readable medium storing instructions, the instructions comprising:
one or more instructions that, when executed by one or more processors, cause the one or more processors to:
receive conditions for enrolling in different types of group-based subscriptions provided by third-party providers;
receive requests to enroll in one or more group-based subscriptions provided by the third-party providers,
wherein the requests are received from devices of customers in a customer population, via a subscription management platform standardized for the different types of group-based subscriptions provided by the third-party providers,
wherein the requests include customer preferences associated with the customers, and
wherein each request, of the requests, requests a respective customer be enrolled in the one or more group-based subscriptions;
determine customer account attributes for customer accounts associated with the customers;
determine, using a customer matching model, scores for the customers based on the customer preferences, the customer account attributes, and the conditions for enrolling in the different types of group-based subscriptions provided by the third-party providers,
wherein the scores predict a successful matching among the customers in the customer population;
assign a first subset of the customers in the customer population to a first group of customers based on the scores;
assign a second subset of the customers in the customer population to a second group of customers based on the scores;
automatically enroll the first group of customers in a shared account for a first group-based subscription, of a first type of group-based subscription of the different types of the group-based subscriptions, provided by a first third-party provider of the third-party providers,
wherein each customer, of the customers in the first group of customers that is enrolled in the shared account for the first group-based subscription, is associated with a separate request to enroll in the one or more group-based subscriptions, and
wherein automatically enrolling the first group of customers includes sending batched customer data, for the first group of customers, to a third-party provider that satisfies conditions for enrolling in the first type of group-based subscription;
provide, via the subscription management platform, an abstracted version of a website of the first third-party provider by which the group of customers interact with a platform of the first third-party and access the shared account;
enroll the second group of customers in a second account for a second group-based subscription;

allocate a payment for the first group-based subscription among a first group of customer accounts associated with the customers in the first group of customers; and allocate a payment for the second group-based subscription among a second group of customer accounts associated with customers in the second group of customers.

17. The non-transitory computer-readable medium of claim 16, wherein:

the first group-based subscription is provided by a first third-party provider; and the second group-based subscription is provided by the first third-party provider.

18. The non-transitory computer-readable medium of claim 16, wherein:

the first group-based subscription is provided by a first third-party provider; and the second group-based subscription is provided by a second third-party provider.

19. The non-transitory computer-readable medium of claim 16, wherein the one or more instructions, when executed by the one or more processors, further cause the one or more processors to:

determine first proportionate billing amounts for the customers in the first group of customers based on a first total billed amount for the first group-based subscription;

determine second proportionate billing amounts for the customers in the second group of customers based on a second total billed amount for the second group-based subscription;

pay the first total billed amount for the first group-based subscription using a first account number associated with a first lead account identified from among the first group of customer accounts;

pay the second total billed amount for the second group-based subscription using a second account number associated with a second lead account identified from among the second group of customer accounts;

debit the first proportionate billing amounts from a first plurality of non-lead accounts identified from among the first group of customer accounts;

debit the second proportionate billing amounts from a second plurality of non-lead accounts identified from among the second group of customer accounts;

credit the first proportionate billing amounts debited from the first plurality of non-lead accounts to the first lead account; and credit the second proportionate billing amounts debited from the second plurality of non-lead accounts to the second lead account.

20. The non-transitory computer-readable medium of claim 16, wherein the one or more instructions, when executed by the one or more processors, further cause the one or more processors to:

assign a third subset of the customers in the customer population to a third group of customers based on the scores; and enroll the third group of customers in a third account for a third group-based subscription.

* * * * *